United States Patent
Tollefson et al.

[15] 3,647,486
[45] Mar. 7, 1972

[54] METHOD OF PREPARING CANNED COOKED RICE

[72] Inventors: Charles I. Tollefson; Claude W. Bice, both of Rochester, N.Y.

[73] Assignee: The R. T. French Company, Rochester, N.Y.

[22] Filed: Apr. 3, 1968

[21] Appl. No.: 718,333

[52] U.S. Cl. .................................99/186, 99/80, 99/214
[51] Int. Cl. ..................................................A23b 7/00
[58] Field of Search...............99/80, 81, 182, 186, 214, 215, 99/154, 80 PS

[56] References Cited

UNITED STATES PATENTS

| | | | |
|---|---|---|---|
| 2,292,431 | 8/1942 | Coan | 99/186 |
| 2,334,665 | 11/1943 | Yonan-Malek | 99/186 X |
| 2,334,666 | 11/1943 | Yonan-Malek | 99/186 X |
| 2,785,070 | 3/1957 | Kester et al. | 99/81 |
| 2,616,810 | 11/1952 | Benton | 99/186 |
| 2,686,130 | 8/1954 | Roberts | 99/80 X |
| 2,696,158 | 12/1954 | Shuman et al. | 99/80 |
| 2,898,214 | 8/1959 | Ferrel | 99/186 |
| 2,898,215 | 8/1959 | Ferrel | 99/186 |
| 2,696,156 | 12/1954 | Campbell et al. | 99/80 |
| 2,937,946 | 5/1960 | Ozai-Durrani | 99/80 X |
| 3,189,461 | 6/1965 | Ozai-Durrani et al. | 99/80 PS |
| 3,189,462 | 6/1965 | Autrey et al. | 99/80 PS |
| 3,408,202 | 10/1968 | Serbia et al. | 99/80 PS |

FOREIGN PATENTS OR APPLICATIONS 494,085 10/1938 Great Britain .............................99/80

*Primary Examiner*—Norman Yudkoff
*Assistant Examiner*—Hiram H. Bernstein
*Attorney*—B. Edward Shlesinger

[57] ABSTRACT

Raw rice is cooked in acidified water at a temperature above the gelatinization point of starch but below the boiling point of water for a sufficient period to achieve a moisture content between 58 and 65 percent. The cooked rice is then canned and the cans sealed and sterilized. Then the cans are cooled and the product is allowed to remain in the cans ("aged") for several days before consumption.

2 Claims, No Drawings

METHOD OF PREPARING CANNED COOKED RICE

The present invention relates to the canning of foodstuffs, and more particularly to the canning of rice. In a still more specific aspect, it relates to the canning of parboiled rice, to obtain a product that can be prepared for consumption by merely heating it in a skillet.

Canning of cooked rice has not generally been successful heretofore because of the tendency of the cooked rice kernels to cohere, which makes it difficult to remove the rice from the can and separate the individual kernels when the can is opened. Another disadvantage with prior methods of preparing canned cooked rice is that the kernels are usually ruptured and ragged.

One suggested method for overcoming these difficulties involves soaking the raw rice in water at a temperature below the gelatinization point of starch prior to cooking the rice in boiling water. Soaking at a temperature below the gelatinization point allows the moisture to penetrate to the centers of the kernels so that, when the soaked rice is cooked in boiling water, gelatinization can be obtained at the centers of the kernels with a minimum of overcooking at the surface. Accordingly, fewer cells are ruptured and starch losses are minimized. It has been considered critical to restrict the cooking operation so that the kernels contain not more than 45 to 60 percent moisture, preferably about 55 percent. Since the product is not considered edible at this moisture level, it is prepared for consumption, after removal from the can, by immersing the rice in boiling water to increase its moisture level while at the same time heating it. However, even with this method, an undesirable degree of cohesiveness remains; and the product requires heating in water and draining to prepare it for consumption.

Another prior process, generally similar to the above process, in that soaking and cooking steps are involved, requires an additional step of freezing the canned rice after retorting. The freezing is believed to cause retrogradation of starch. However, this process is costly; and the results are not uniformly dependable since the rate of freezing and/or thawing has an important bearing on the degree of starch retrogradation obtained. Moreover, the rate of freezing affects not only the ease of separation of the kernels, but also the textural properties of the final product.

The primary object of the present invention is to provide a method for preparing canned parboiled rice which will enable the canned product to be readily removed from the can and separated into individual kernels.

Another object of the invention is to provide a method of producing canned cooked rice which can quickly and easily be prepared for consumption, either as a fried rice, or as a component of casseroles, puddings, or other dishes in which cooked rice is used.

Another object of the invention is to provide a method for canning parboiled rice which will produce kernels that are plump, smooth and attractive in appearance, and not ruptured and ragged like the product obtained by other methods.

Another object of the invention is to provide a method for preparing canned rice which will eliminate the soaking step previously required.

Another object of the invention is to provide a method for preparing canned parboiled rice which will have a moisture level high enough so that the product does not require further cooking in water.

Still another object of the invention is to provide a method for preparing canned parboiled rice which will ensure a texture and flavor in the product, when fried, equal to or better than that of the finest quality of fried rice prepared by other methods.

A still further object of the invention is to provide a simplified and economical process for achieving the above-mentioned goals.

Other objects of the invention will be apparent hereinafter from the specification and from the recital of the appended claims.

In the method of the present invention the rice, which is to be canned, is cooked in acidified water, at a temperature above the gelatinization point of starch (65° to 75° C.) but below the boiling point of water, for a sufficient period that the moisture content of the final product will be between 58 and 65 percent, and rupture of surface cells will be minimized, then draining the rice, packing it in cans, sealing the cans, subjecting the sealed cans to a sufficient heat to sterilize the cans and their contents, then cooling the cans and their contents, and aging the product in the cans for several days before consumption.

Additionally, the rice may be cooked in the presence of an edible starch-modifying agent, such as a mixture of mono- and diglycerides, which complexes any free starch and thus reduces cohesiveness. By controlling the amount of free starch, a product with desirable characteristics is obtained, that is, a product which is readily removable from the can and easily separated into individual kernels. Furthermore, a product with desirable textural properties can be achieved with moisture levels in the range 58 to 65 percent, preferably about 62 percent.

The product of the present invention does not require heating in boiling water to further increase the moisture level for consumption. Since cooking is accomplished at temperatures below the boiling point of water, a longer cooking time is required than if the product were cooked in boiling water, but the cooking time is less than the combined soaking and cooking time of prior methods. This has advantage in that precise control of the cooking time is less critical than in other methods.

It has been discovered quite unexpectedly that the canned product improves with storage at ambient temperatures (70° to 75° F). Thus, the kernels of rice canned by the process of the present invention separate much more readily a week or so after retorting than the day after retorting. This effect, which may result from starch retrogradation, is called "aging."

To illustrate the invention, several examples are given below:

EXAMPLE 1

Two pounds of parboiled Belle Patna rice were steeped for 25 minutes with agitation at 165° F. in 1 gallon of water containing 0.15 ml. glacial acetic acid and 15 g. edible monodiglyceride (52 percent alpha monester content). At the end of the steeping (or cooking) period, the rice was drained for 2 minutes, packed in cans (11 ounces per 300×407 can), and processed in a retort for 60 minutes at 240° F. to achieve sterilization. The cans were then cooled in water to an internal temperature of about 120° F. Upon opening the cans, the rice was found to separate fairly readily. The rice was prepared for consumption as fried rice by heating the contents of a can in a skillet at 325° F. with one tablespoonful of cooking oil. The texture of the fried rice was considered acceptable although slightly tough, but this was not unexpected since the moisture content of the cooked rice was only 58 percent.

EXAMPLE 2

Parboiled rice was processed as in example 1 except that the steeping time was increased to 30 minutes. The moisture level of the canned rice was 60.9 percent. When a can was opened immediately after cooling, the rice seemed somewhat more sticky than that produced in example 1. However, when the canned product was "aged" for several days after processing, and before opening a can, the kernels separated very readily, and the texture of the fried product was rated as very good.

EXAMPLE 3

Parboiled rice was processed as in example 1 except that the steeping time was decreased to 20 minutes. The moisture level of the canned rice was 55.5 percent, and the texture of the fried product was considered undesirably tough.

EXAMPLE 4

Parboiled rice was prepared as in example 1 except that the steeping temperature was 175° F. and times of 20, 25, and 30 minutes were employed. The results were as follows:

| Steeping Time | Percent Moisture | Texture of Fried Product |
| --- | --- | --- |
| 20 minutes | 58.9 | Slightly dry and tough |
| 25 minutes | 62.1 | Excellent |
| 30 minutes | 64.5 | Acceptable, slightly soft |

EXAMPLE 5

Parboiled rice was processed as in example 4 except that the steeping temperature was 185° F. and times of 15, 20 and 25 minutes were employed. Results were as follows:

| Steeping Time | Percent Moisture | Texture of Fried Product |
| --- | --- | --- |
| 15 minutes | 59.0 | Acceptable, slightly dry |
| 20 minutes | 63.4 | Very good |
| 25 minutes | 66.2 | Somewhat too soft |

EXAMPLE 6

Parboiled rice was processed as in example 1 except that the rice was steeped in boiling water for periods ranging from 7 to 15 minutes. Results were as follows:

| Steeping Time | Percent Moisture | Texture of Fried Product |
| --- | --- | --- |
| 7 minutes | 53.7 | Firm, dry |
| 8 minutes | 55.3 | Firm, dry |
| 9 minutes | 57.5 | Firm, dry |
| 10 minutes | 59.3 | Acceptable, somewhat dry |
| 11 minutes | 60.6 | Acceptable, somewhat dry |
| 12 minutes | 61.6 | Acceptable |
| 13 minutes | 63.8 | Acceptable, somewhat soft |
| 14 minutes | 64.5 | Too soft for fried rice |
| 15 minutes | 65.8 | Too soft for fried rice |

When compared with the products of comparable moisture levels obtained by steeping at lower temperatures (such as 175° F.), it was found that the product obtained from cooking in boiling water while perhaps acceptable in a general sense, was inferior in quality to the product obtained when the rice was steeped in water at a temperature below the boiling point of water. Thus, in comparing products of equivalent moisture content, it was found that the product obtained using a steeping temperature of 175' F., for example, was superior to the product obtained using boiling water in the following respects:

a. The rice grains were less cohesive.
b. There was less rupturing of kernels: hence solids losses were reduced.
c. The color was somewhat lighter and brighter.
d. The fried product had firmer texture which is highly desirable in oriental-type fried rice.

Moreover, processing in boiling water requires precise control of cooking time since small changes in cooking time result in relatively large changes in moisture content, thus making it difficult to obtain consistently a product having the desired moisture content.

EXAMPLE 7

Parboiled rice was processed as in examples 1 through 5 except that no monodiglyceride was added to the steeping water. Immediately after processing, the canned rice was somewhat more sticky than canned rice processed with monodiglyceride. However, after aging the product in the can for 2 to 3 weeks at room temperature (about 70° F.), cohesiveness had decreased so that differences in ease of separating kernels, as related to presence or absence of monodiglyceride, were hard to demonstrate.

Besides mono- and diglycerides, other starch-complexing agents, such as sodium stearyl fumarate and calcium stearyl-2-lactylate were also investigated. All these starch-complexing agents were found to provide similar benefits with regard to ease of separating kernels of rice immediately after processing.

Several acidulants, other than glacial acetic acid, were also investigated, including fumaric acid, malic acid, tartaric acid, ascorbic acid, isoascorbic acid, succinic acid, citric acid, and adipic acid. All of these acids were found satisfactory for this purpose.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A process for canning parboiled rice which comprises parboiling the rice,
steeping the rice in acidified water with agitation at a temperature between 165° and 185° F. between the gelatinization point of starch and the boiling point of water for a period sufficient for the moisture content of the final product to be between 58 and 65 percent,
draining the cooked rice,
packing the drained rice in cans,
sealing the cans,
heating the sealed cans to sterilize them and their contents,
cooling the cans and their contents, and
aging the product in the cans for several days at room temperature,
the steeping being carried out in water containing an edible starch-complexing agent selected from the group consisting of mono- and diglycerides, sodium stearyl fumarate, and calcium stearyl-2-lactylate.

2. A process as claimed in claim 1, wherein the starch-complexing agent is a mixture of mono- and diglycerides in an amount by weight between 0.5 and 5 percent of the dry weight of the rice.

* * * * *